United States Patent [19]

Brands

[11] Patent Number: 6,052,467
[45] Date of Patent: Apr. 18, 2000

[54] SYSTEM FOR ENSURING THAT THE BLINDING OF SECRET-KEY CERTIFICATES IS RESTRICTED, EVEN IF THE ISSUING PROTOCOL IS PERFORMED IN PARALLEL MODE

[76] Inventor: Stefanus A. Brands, V.d. Mondestraat 75, NL-3515 BC Utrecht, Netherlands

[21] Appl. No.: 08/930,029
[22] PCT Filed: Mar. 27, 1996
[86] PCT No.: PCT/NL96/00129
  § 371 Date: Feb. 19, 1998
  § 102(e) Date: Feb. 19, 1998
[87] PCT Pub. No.: WO96/31034
  PCT Pub. Date: Oct. 3, 1996

[30] Foreign Application Priority Data

Mar. 27, 1995 [NL] Netherlands ............................. 9500584

[51] Int. Cl.[7] ...................................................... H04L 9/30
[52] U.S. Cl. .............................. 380/279; 380/30; 705/69; 713/180
[58] Field of Search ................................. 380/21, 28, 30, 380/277, 279, 278, 282; 705/69; 713/180, 156

[56] References Cited

U.S. PATENT DOCUMENTS

| 5,521,980 | 5/1996 | Brands | 380/30 |
| 5,606,617 | 2/1997 | Brands | 380/30 |

FOREIGN PATENT DOCUMENTS

| 0214609 | 3/1987 | European Pat. Off. | H04L 9/00 |
| 95/04417 | 2/1995 | WIPO | H04L 9/32 |

OTHER PUBLICATIONS

P. Horster et al "Meta–Elgamal Signature Schemes", Technical Report TR–941–5–F, 1994 University of Technology Chemnitz–Zwickau 16 pages.

P. Horster et al "Meta–Message Recovery and Meta–Blind Signature Schemes Based on the Discrete Logarithm Problem and Their Applications" ASIACRYPT '94 Proceedings pp. 224–237.

S. A. Brands, "Untraceable Off–Line Cash in Wallet with Observers" Proceedings of Crypto '93 pp. 302–318.

S. Brands, "More on Restrictive Blind Issuing of Secret–key Certificates in Parallel Mode," *Centrum voor Wiskunde en Informatica Report*, CS–R9534, pp. 2 and bibliography items 9 & 10 (Mar. 1995, Amsterdam, NL, XP002009896).

S. Brands, "A Note on Parallel Executions of Restrictive Blind Issuing Protocols for Secret–key Certificates," *Centrum voor Wiskunde en Informatica Report*, CS–R9519, pp. 2 (Mar. 1995, Amsterdam, NL, XP002009892).

S. Brands, "Restrictive Binding of Secret–key Certificates," *Centrum voor Wiskunde en Informatica Report*, CS–R9509, pp. 10; Fig. 1; pp. 26–29; bibliography item 3 (Feb. 1995, Amsterdam, NL, XP002009893).

S. Brands, "Secret–key Certificates," *Centrum voor Wiskunde en Informatica Report*, CS–R9510, abstract (Feb. 1995, Amsterdam, NL, XP002009894).

S. Brands, "Restrictive Blind Issuing of Secret–key Cerificates in Parallel Mode," *Centrum voor Wiskunde en Informatica Report*, CS–R9523, pp. 1–3; all Figs. (Mar. 1995, Amsterdam, NL, XP002009895).

S. Brands, "Secret–key Certificates," *Centrum voor Wiskunde en Informatica Report*, CS–R9555, establishes publication dates of CS–R9509 and CS–R9510, (Jul. 1995, Amsterdam, NL, XP002009897).

*Primary Examiner*—Pinchus M. Laufer
*Attorney, Agent, or Firm*—Banner & Witcoff, Ltd.

[57] ABSTRACT

A cryptographic method is disclosed that enables the issuer in a secret-key certificate issuing protocol to issue triples consisting of a secret key, a corresponding public key, and a secret-key certificate of the issuer on the public key, in such a way that receiving parties can blind the public key and the certificate, but cannot blind a predetermined non-trivial predicate of the secret key even when executions of the issuing protocol are performed in parallel.

6 Claims, 2 Drawing Sheets

SYSTEM FOR ENSURING THAT THE BLINDING OF SECRET-KEY CERTIFICATES IS RESTRICTED, EVEN IF THE ISSUING PROTOCOL IS PERFORMED IN PARALLEL MODE

CROSS-REFERENCE TO RELATED APPLICATIONS

The present application claims priority to International Application Number PCT/NL96/00129, filed in accordance with the Patent Cooperation Treaty on Mar. 27, 1996, entitled "System for Ensuring that the Blinding of Secret-Key Certificates is Restricted, Even if the Issuing Protocol is Performed in Parallel Mode."

BACKGROUND OF THE INVENTION

1. Field of the Invention

The present invention relates to cryptographic techniques, and more particularly to a method for implementing certificate issuing protocols that can be blinded only restrictively even when the issuing is performed in parallel mode.

2. Description of the Prior Art

Two basic types of certificates can be distinguished, public-key certificates and secret-key certificates. A public-key certificate is a digital signature of an issuer herein called a Certification Authority, on a public key. The other basic type, secret-key certificates, is described and claimed in patent application Ser. No. 08/321,855, filed Oct. 14, 1994, now U.S. Pat. No. 5,606,617. As with public-key certificates, triples consisting of a secret key, a corresponding public key and a secret-key certificate on the public key can only be retrieved by engaging in an issuing protocol with the Certification Authority. The difference with public-key certificates is that pairs consisting of a public key and a secret-key certificate on the public key can be generated by anyone.

Many signature transporting mechanisms require a Certification Authority to issue triples, consisting of a secret key, a matching public key, and a certificate of the Certification Authority on the public key. Of particular interest for privacy-protecting mechanisms for signature transport are so-called restrictive blind certificate issuing protocols, in which the receiver can blind the issued public key and the certificate, but not a predetermined non-trivial predicate of the secret key; this part of the secret-key is said to be blinding-invariant. Restrictive blind certificate issuing protocols, and methods for applying them to privacy-protecting mechanisms for value transfer such as in particular off-line electronic cash, are described and claimed in patent application Ser. No. 08/203,231, filed Feb. 28, 1994, now U.S. Pat. No. 5,521,980.

Patent application Ser. No. 08/203,231, filed Feb. 28, 1994, and patent application Ser. No. 08/321,855, filed Oct. 14, 1994, now U.S. Pat. No. 5,521,980 and 5,606,617, respectively describe and claim restrictive blind certificate issuing protocols for secret-key certificates. Only one restrictive blind issuing protocol for public-key certificates is described in patent application Ser. No. 08/203,231, filed Feb. 28, 1994, now U.S. Pat. No. 5,521,980; all the other exemplary schemes are for issuing secret-key certificates. While these secret-key certificate issuing protocols are believed to be secure when executed sequentially, they should not be run in parallel when different blinding-invariant numbers are involved: that would enable an attack in which completely blinded triples can be retrieved. In other words, even the presumed blinding-invariant numbers can then be blinded.

For highly demanding transaction environments it is believed to be desirable to have certificate issuing protocols that are secure even when they are executed in parallel. This also allows the issuing to be performed in a distributed manner without requiring coordination between the distributed issuing agents. This invention describes an inventive method for designing certificate issuing protocols that are restrictive blind even when executions of the issuing protocol are performed in parallel with respect to different blinding-invariant numbers. The inventive method can be applied to at least all the secret-key certificate schemes described in patent application Ser. No. 08/203,231, filed Feb. 28, 1994, and patent application Ser. No. 08/321,855, filed Oct. 14, 1994, now U.S. Pat. No. 5,521,980 and 5,606,617, respectively.

OBJECTS OF THE INVENTION

Accordingly, it is an object of the present invention to construct efficient and secure restrictive blind certificate issuing protocols, by means of which an issuer party can issue triples consisting of a secret key, a matching public key and a corresponding certificate, such that the public key and the certificate can be perfectly blinded by the receiving party, but at least part of the secret key cannot be blinded even when executions of the protocol are performed in parallel.

Another object of the present invention is to allow the issuer party in these restrictive blind issuing protocols to be represented by distributed issuing agents that can securely perform the issuing protocol without central coordination between the agents.

A further object of the present invention is to describe a timing mechanism for the issuing protocols in order to offer even greater protection against attacks on parallel executions of the issuing protocols.

Yet another object of the present invention is to allow efficient, economical, and practical apparatus and methods fulfilling the other objects of the invention.

Other features, objects, and advantages of this invention will be appreciated when the description and appended claims are read in conjunction with the figures.

SUMMARY OF THE INVENTION

In accordance with these and other objects of this invention, a brief summary of the invention is presented. Some simplifications and omissions may be made in the following summary, which is intended to highlight and introduce some aspects of the present invention, but not to limit its scope. Detailed descriptions of preferred exemplary embodiments adequate to allow those of ordinary skill in the art to make and use this invention will be provided later.

In an issuing protocol for secret-key certificates, a Certification Authority issues triples. Each triple consists of a secret key, a corresponding public key and a certificate of the Certification Authority on the public key. If such an issuing protocol is restrictive blind, then a receiver party that obtains such a triple can ensure that the public key and the certificate are completely uncorrelated to the view of the Certification Authority; but on the other hand the receiver party cannot dispose of a certain predicate of the secret key, and so the Certification Authority can encode information into this predicate of the secret key.

In the secret-key certificate issuing protocols described in patent application Ser. No. 08/203,231, filed Feb. 28, 1994, and patent application Ser. No. 08/321,855, filed Oct. 14, 1994, now U.S. Pat. No. 5,521,980 and 5,606,617, respectively, secret-key certificate issuing protocols are described that are restrictive blind if the issuing protocol is executed sequentially. In each of these protocols, the Certification Authority starts by sending to the receiver party some initial information; following this, the receiver party blinds the public key and computes a challenge number that it sends to the Certification Authority; the Certification Authority then computes a response, forming a logical relation between the blinding-invariant part of the secret key for the receiver party and its own secret key, and sends the response to the receiver party; and, finally, the receiver party verifies the correctness of the response by using the public key of the Certification Authority, and corrects the response to obtain the blinded certificate on the blinded public key. Performing such a protocol sequentially means that the Certification Authority will only send new initial information for a second execution of the protocol after it has received a challenge number for the first execution of the protocol. (To prevent queueing the Certification Authority should respond to a challenge of a receiver party only if the challenge has been provided within some predetermined time period after having sent out the initial information.)

Although the Certification Authority can perform executions of these issuing protocols in parallel in case the same blinding-invariant information is used, these issuing protocols cannot be performed generally in parallel. To enable the Certification Authority to perform executions of the issuing protocol in parallel without any restrictions, the inventive method described in this application can be used to modify these issuing protocols. Denoting the initial information provided by the issuer in the i-th execution of these issuing protocols by $a_i$, the modification consists of letting the issuer instead send $f(a_i)$. Here, $f(\cdot)$ is a function for which it is easy to compute $f(ab)$ from $f(a)$ and b, but substantially unfeasible to compute algebraic relations such as $f(ab)$ or $f(a^3b^5)$ from $f(a)$ and $f(b)$. Since a and b are generated from some mathematical group, such as the multiplicative group of integers modulo a large prime p, or the multiplicative group $\mathbb{Z}_n$ of integers modulo a composite n that is the product of at least two large primes, the product ab in $f(ab)$ must be the group product. A particular embodiment for $f(\cdot)$ that will be described in the detailed description takes $f(a)$ to be equal to $F^a$, where F is an element in an appropriate group in which it is unfeasible to compute discrete logarithms, and such that the order of F in that group is equal to the modulus of the group in which a resides.

In the first embodiment that will be described in the detailed description, a is an element of $\mathbb{Z}_p$, the multiplicative group of integers module a prime p, and F is correspondingly taken to be an element of order p in some multiplicative group whose order is a multiple of p and in which it is substantially unfeasible to compute discrete logarithms to the basis F. As one can see, for a,b in $\mathbb{Z}_p$ it is easy to compute $F^{abmodp}$ from $F^a$ and b, by raising $F^a$ to the power b. However, computing forms such as $F^{abmodp}$ from $F^a$ and $F^b$ seems to require the capability to break a presumably verb hard problem (known in the art as the Diffie-Hellman problem). If the Certification Authority in the modified issuing protocol requires the receiver parties to rapidly respond to its initial information, then this task should be especially difficult to perform.

In the second embodiment that will be described in the detailed description a is an element of $\mathbb{Z}_n$, the multiplicative group of integers modulo some composite modulus n. As with the first embodiment, F is taken to be an element of order n in some multiplicative group whose order is a multiple of n and in which it is difficult to compute discrete logarithms to the basis F.

In sum, the present invention describes a method for preventing attackers to exploit algebraic relations between the initial information provided by the Certification Authority in parallel executions of restrictive blind certificate issuing protocols.

DETAILED DESCRIPTION OF THE INVENTION

Figure 1:
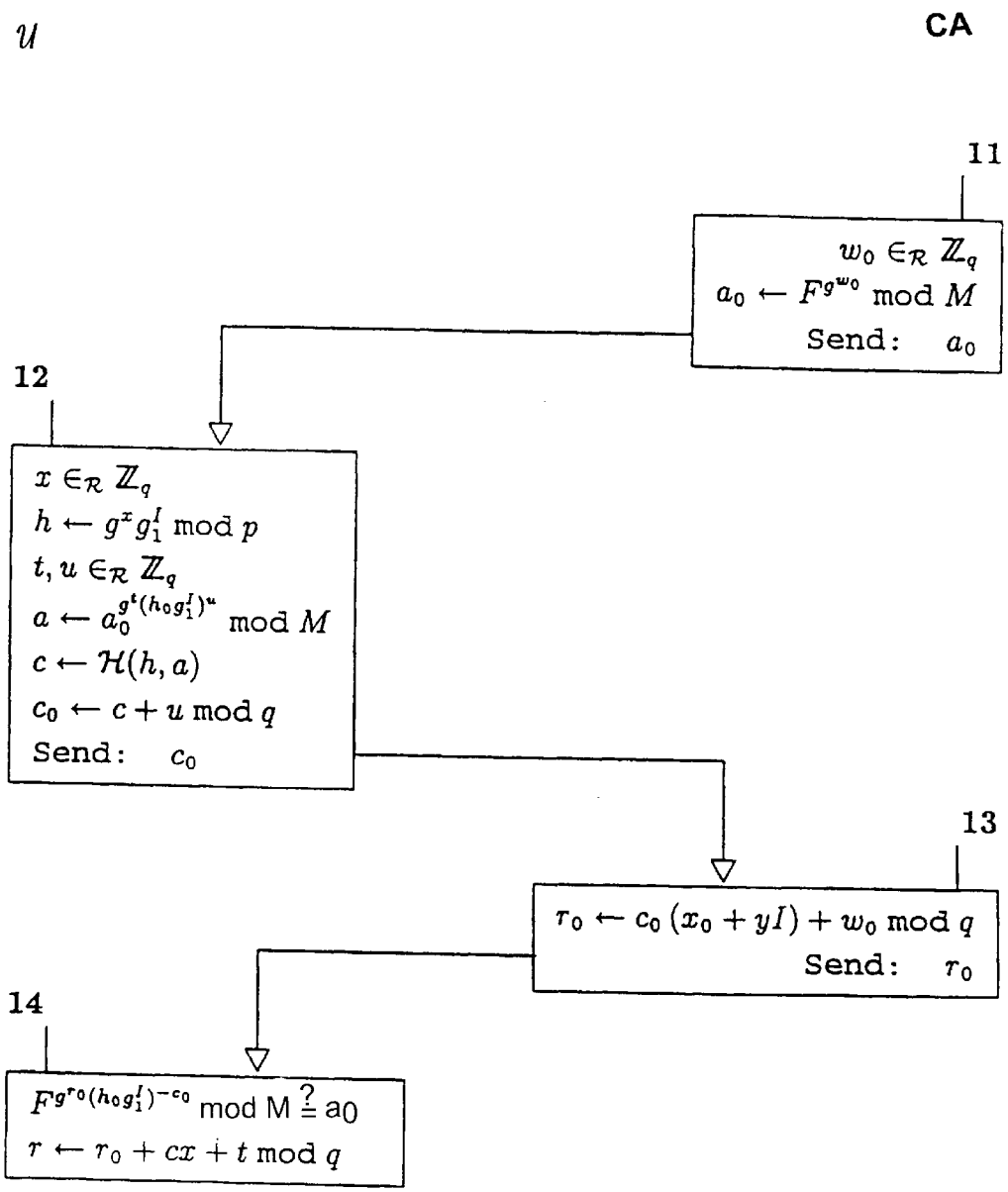
FIG. 1 shows a flowchart of a restrictive blind secret-key certificate issuing protocol for the first preferred embodiment in accordance with the teachings of the present invention.
Figure 2:
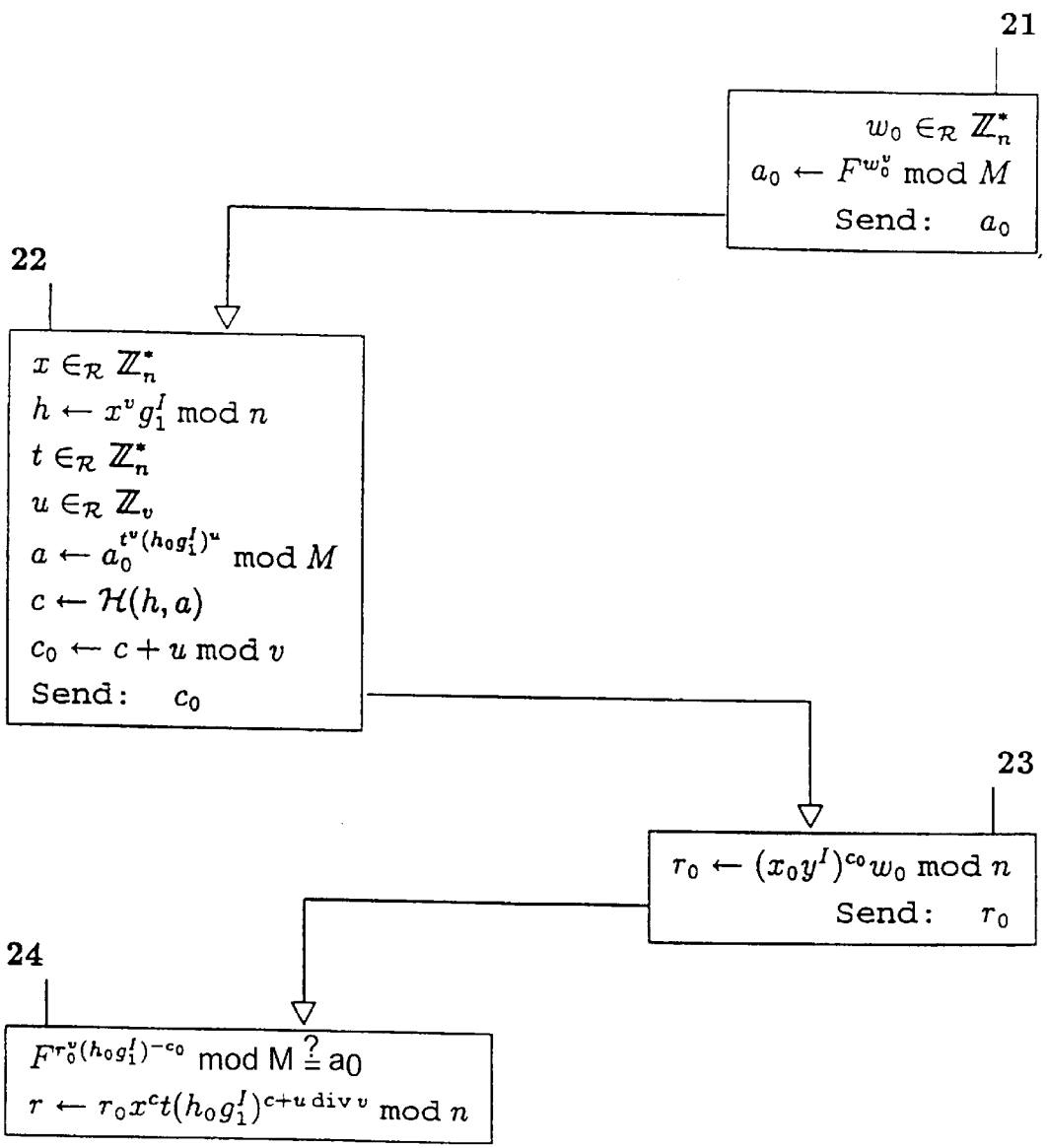
FIG. 2 shows a flowchart of a restrictive blind secret-key certificate issuing protocol for the second preferred embodiment in accordance with the teachings of the present invention.

While it is believed that the notation of FIGS. 1 and 2 would be clear to those of ordinary skill in the art, it is first reviewed here for definiteness.

The flowcharts describe restrictive blind issuing protocols for secret-key certificates. The actions performed by the parties participating in these issuing protocols are grouped together into flowchart boxes. The party performing the actions described in a flowchart box is indicated by the column that the box is in. The columns are labeled by a symbol denoting the type of party. The term "party" is used to indicate an entity with control over at least the secrecy of some information. It is anticipated that a plurality of people may each know all or part of some key, and that they might collectively be thought of as a party. In other cases, a key may be substantially unknown to people, and reside in some physical device, and the device itself or those who control it from time to time, may be regarded as parties. Thus the parties denoted by single boxes or collections of boxes might sometimes be regarded as agents who perform a step or a collection of steps in a protocol. They might also be regarded as means for performing those steps, and might be comprised of any suitable configuration of digital logic circuitry. For example, any box or collection of boxes from the figures could be realized by hard-wired and dedicated combinatorial logic, or by some sort of suitably programmed machine, a microprocessor for instance, such as are well-known in the art, just as long as it is able to perform the storage, input/output and transformational steps (possibly apart from the random source functions) described by the corresponding box or boxes.

As is common in the art, for any integer, l, the symbol $\mathbb{Z}_l$ denotes the set of of numbers $\{0, \ldots, l-1\}$. Addition and multiplication of elements in $\mathbb{Z}_l$ are defined modulo l. Similarly, the symbol $\mathbb{Z}_l^*$ denotes the set of numbers in $\{0, \ldots, l1\}$ that are co-prime to l. Multiplication of elements in $\mathbb{Z}_l^*$ is defined modulo l. $\mathbb{Z}_l$ is called a ring of integers modulo l, and $\mathbb{Z}_l^*$ is called a multiplicative group of integers modulo l.

In case an element is chosen from a ring or group, it is, implicitly assumed to be the smallest positive representative. The same holds for outcomes of computations.

The symbol "←" denotes assignment, meaning that the variable or symbol on its left-hand side is assigned the value on its right-hand side to. Assignments do not necessarily imply that storage space must actually be reserved; they may indicate intermediate values manipulated in volatile memory.

Another operation is a test for equality, which is indicated by the =? symbol. As is common in the art, the protocol halts in the case the equality does not hold.

The symbol $\in_R$ indicates that the number, or each of the numbers, on its left-hand side is chosen from the ring or group on its right-hand side according to a uniform probability distribution, and independent of anything else. In practice pseudo-random techniques may be used, and the deviation from the uniform distribution may be significant without resulting in an appreciable loss in security.

Another action is denoted by the word "Send," followed by a colon and a number. This indicates that the numbers are sent by the party performing the actions described in the box to the other party participating in the protocol. The directed connections between the boxes indicate the order in which the actions that are grouped in the boxes are performed.

The Certification Authority will henceforth be abbreviated as CA, and a receiver party to U. In both preferred embodiments that will be described, the exemplary secret-key certificates and corresponding restrictive blind issuing protocols are modifications of the secret-key certificate schemes described in patent application Ser. No. 08/321,855, filed Oct. 14, 1994 now U.S. Pat. No. 5,606,617. Since the inventive technique for these modifications applies to all the secret-key certificate schemes described in patent application Ser. No. 08/321,855, filed Oct. 14, 1994 now U.S. Pat. No. 5,606,617, only one exemplary detailed description will be provided for each of the two preferred embodiments.

As will be appreciated, the examples are only intended to be suggestive and not limiting in any way. It is believed that those of ordinary skill in the art will be able to straightforwardly apply the inventive modification technique to other certificate schemes.

FIRST PREFERRED EMBODIMENT

An exemplary secret-key certificate in the first preferred embodiment will now be described in detail. This description shows the inventive modification technique applied to the first exemplary secret-key certificate scheme of the first preferred embodiment of patent application Ser. No. 08/321,855, filed Oct. 14, 1994.

The secret key of the CA is a pair $(x_o,y)$ in $\mathbb{Z}_q \times \mathbb{Z}_q$, where q is a prime number. The corresponding public key of the CA is $(P,g,h_o,g_1,M,F)$, where: p is a prime number such that q divides p−1 evenly; g is an element of order q in the group $\mathbb{Z}_p$; $h_o$ is equal to $g^{x_o}$ mod p; $g_1$ is equal to $g^g$ mod p; M is a number such that p divides the order of $\mathbb{Z}_M$ evenly; and F is an element of order p in $\mathbb{Z}_M$. M is preferably a prime number, although it can equally well be taken a composite, as long as it seems unfeasible to compute discrete logarithms to the basis F in $\mathbb{Z}_M$. Note that this construction ensures that in computations such as, for instance, $F^{ab}$ mod M, the computation in the exponent is performed modulo p. Indeed, a computation such as $F^{g^r}$ mod M can be performed by first computing $g^r$ mod p, and then raising F modulo M to the outcome of $g^r$ mod p.

The CA also makes publicly known a hash-function $H(\cdot)$ that maps its arguments to $\mathbb{Z}_{2^l}$, for some appropriate security parameter l, and that is substantially unfeasible to inverts Preferably $H(\cdot)$ is collision-free, meaning that it is unfeasible to compute two distinct arguments that are mapped by $H(\cdot)$ to the same outcome.

A secret-key certificate on a public key h in $\mathbb{Z}_p$ of U is a pair (c,r) in $\mathbb{Z}_{2^l} \times \mathbb{Z}_1$ such that c is equal to $X(h,F^{g^{(h_o h)^c}}$ mod M). (As will be clear to those of ordinary skill in the art, the secret-key certificate can alternatively be taken to be a pair (a,r) in $\mathbb{Z}_M \times \mathbb{Z}_1$. In that case, the pair is a secret-key certificate on h if $F^{g^{(h_o h)^c}}$ mod M is equal to a, where c is computed as H(h,a). Moreover one can in that case replace a by some one-way hash of a, to shorten the length of the certificate.)

Turning now to FIG. 1, a flowchart of a restrictive blind issuing protocol for these secret-key certificates will now be described in detail.

A secret key of U is a pair (x,I) in $\mathbb{Z}_q \times \mathbb{Z}_q$ such that $g^x g_1^I$ mod p is equal to h. The second number of this pair, I, will be encoded by the CA into the secret key of U during the restrictive blind certificate issuing protocol; I mod q is the blinding-invariant part of the secret key. It cannot be blinded even when the CA performs executions of the issuing protocol in parallel for distinct blinding-invariant numbers.

Box 11 first shows the CA generating at random a number $w_o$ in $\mathbb{Z}_q$. The second line shows the CA computing $F^{g^{w_o}}$ mod M, which is denoted by $a_o$ for further reference. As described by the third line, the CA then transfers $a_o$ to U.

Box 12 first shows U generating a number x in $\mathbb{Z}_q$; the pair (x,I) will be its secret key. The second line shows U computing the corresponding public key h, by setting it equal to $g^x g_1^I$ mod p. In addition, as displayed in the third line, U generates two random numbers t,u in $\mathbb{Z}_q$, which will serve to obtain blinded r and c. The fourth line shows U computing $a_o g^t (h_o g^I)^u$ mod M, which is denoted by a for further reference. As indicated in the fifth line, U then computes H(h,a), which is denoted by c. The sixth line specifies U computing c+u mod q, which is denoted by $c_o$. As described by the seventh line, U then transfers $c_o$ to the CA.

Box 13 first shows the CA computing $c_o(x_o+yI)+w_o$ mod q, which is denoted by $r_o$ for further reference. As described by the second line, the CA then transfers $r_o$ to U.

Box 14 first shows U verifying whether $F^{g^{r_o} h_o g^I)^{-c_o}}$ mod M is equal to $a_o$. As described by the second line, if this is the case then U computes $r_o+cx+t$ mod q, which is denoted by r.

As can easily be verified by those of ordinary skill in the art, the pair (c,r) is a secret-key certificate on the public key h of U, such that U knows secret key (x,I) corresponding to h. This certificate issuing protocol is believed to be restrictive blind, with blinding-invariant number I mod q, even when the CA performs executions of the protocol in parallel for different blinding-invariant numbers.

To make attacks on parallel executions of this issuing protocol still more difficult, the following timing mechanism can be built in. The CA initially determines some appropriate time bound (which may vary per execution of the issuing protocol, or per receiver party). If the delay in time between sending out the number $a_o$ to U, as shown in Box 11, and receiving the challenge $c_o$ from U, as shown in Box 12, exceeds this time bound, then the CA will not provide the response $r_o$; the CA can time this delay by means of a sufficiently accurate clock. Failure to provide a challenge in time then means that the receiver party must try again, in a new execution of the issuing protocol.

SECOND PREFERRED EMBODIMENT

An exemplary secret-key certificate in the second preferred embodiment will now be described in detail. This description shows the inventive modification technique applied to the first exemplary secret-key certificate scheme of the second preferred embodiment of patent application Ser. No. 08/321,855, filed Oct. 14, 1994 now U.S. Pat. No. 5,606,617.

The secret key of the CA is a pair $(x_o,g)$ in $\mathbb{Z}_n \times \mathbb{Z}_n$, where n is the product of two distinct prime numbers. (Alternatively, the prime factorization of n can serve as the secret key.) The corresponding public key of the CA is $(n,v,h_o,g_I,M,F)$, where: v is an element in $\mathbb{Z}_n$, for explicitness and without loss of generality taken to be a prime number that is co-prime to the number of elements, p(n), in $\mathbb{Z}_n$; $h_o$ is equal to $x_o^v$ mod n; $g_I$ is equal to $g^v$ mod n; M is a number such that n divides the order of $\mathbb{Z}_M$ evenly; and F is an element of order n in $\mathbb{Z}_M$. M is preferably a prime number, although it can equally well be taken a composite, as long as it seems unfeasible to compute discrete logarithms to the basis F in $\mathbb{Z}_M$.

The CA also makes publicly known a, preferably collision-free, one-way hash-function $H(\cdot)$ that maps its arguments to $\mathbb{Z}_{2^l}$, for some appropriate security parameter l.

A secret-key certificate on a public key h in $\mathbb{Z}_n$ of U is a pair (c,r) in $\mathbb{Z}_{2^l} \times \mathbb{Z}_n$ such that c is equal to $H(h, F^{r^v(h \circ h) \cdot c}$ mod M). (The secret-key certificate can alternatively be taken to be a pair (a,r) in $\mathbb{Z}_M \times \mathbb{Z}_n$. In that case, the pair is a secret-key certificate on h if $F^{r^v(h \circ h) \cdot c}$ is equal to a, where c is computed as H(h,a). Moreover one can in that case replace a by some one-way hash of a, to shorten the length of the certificate.)

Turning now to FIG. 2, a flowchart of a restrictive blind issuing protocol for these secret-key certificates will now be described in detail.

A secret key of U is a pair (x,I) in $\mathbb{Z}_n \times \mathbb{Z}_v$ such that $x^v g_I^I$ mod n is equal to h. The second number of this pair, I, will be encoded by the CA into the secret key of U during the restrictive blind certificate issuing protocol; I mod v is the blinding-invariant part of the secret key. It cannot be blinded even when the CA performs executions of the issuing protocol in parallel for distinct blinding-invariant numbers.

Box 21 first shows the CA generating at random a number $W_o$ at in $\mathbb{Z}_n$. The second line shows the CA computing $F^{w_o v}$ mod M, which is denoted by $a_o$ for further reference. As described by the third line, the CA then transfers $a_o$ to U.

Box 22 first shows U generating a number x in $\mathbb{Z}_n$; the pair (x,I) will be its secret key. The second line shows U computing the corresponding public key h, by setting it equal to $x^v g_I^I$ mod n. In addition, as displayed in the third and fourth lines, U generates two random numbers t in $\mathbb{Z}_n$ and u in $\mathbb{Z}_v$, which will serve to obtain blinded r and c. The fifth line shows U computing $a_o^{t^v(h \circ g_I)^u}$ mod M, which is denoted by a for further reference. As indicated in the sixth line, U then computes H(h,a), which is denoted by c. The seventh line specifies U computing c+u mod v, which is denoted by $c_o$. As described by the eighth line, U then transfers $c_o$ to the CA.

Box 23 first shows the CA computing $(x_o g_I^I)^{c_o} w_o$ mod n, which is denoted by $r_o$ for further reference. As described by the second line, the CA then transfers $r_o$ to U.

Box 24 first shows U verifying whether $F^{r_o^v (h \circ g_I) \cdot c_o}$ mod M is equal to $a_o$. As described by the second line, if this is the case then U computes $r_o x^c t (h_o g_I^I)^{c+u\, div\, v}$ mod n, which is denoted by r.

As can easily be verified by those of ordinary skill in the art, the pair (c,r) is a secret-key certificate on the public key h of U, such that U knows secret key (x,I) corresponding to h. This certificate issuing protocol is believed to be restrictive blind, with blinding-invariant number I mod v, even when the CA performs executions of the protocol in parallel for different blinding-invariant numbers.

To make attacks on parallel executions of this issuing protocol still more difficult, the timing mechanism described in the first preferred embodiment can be built in.

CONCLUSION

This concludes the detailed descriptions of two preferred embodiments. While these descriptions of the present invention have been given as examples, it will be appreciated that various modifications, alternate configurations, and equivalents may be employed without departing from the spirit and scope of the present invention. For example, there are many essentially equivalent orders to evaluate expressions; ways to evaluate expressions; ways to order expressions, tests, and transmissions within flowchart boxes; ways to group operations into flowchart boxes; and ways to order flowchart boxes. The particular choices that have been made here are merely for clarity in exposition.

It will be appreciated that all the techniques developed in patent application Ser. No. 08/203,231, filed Feb. 28, 1994 now U.S. Pat. No. 5,521,980, for applying the restrictive blind issuing protocols in privacy-protecting mechanisms for value transport, such as off-line electronic cash, can be applied straightforwardly in conjunction with the modified issuing protocols.

Certain variations and substitutions may be apparent to those of ordinary skill in the art. Although various such variations and substitutions have been indicated in the text, this may be more fully appreciated in the light of the following example.

The exemplary issuing protocols that have been described are modifications of restrictive blind certificate issuing protocols that are described and claimed in patent application Ser. No. 08/203,231, filed Feb. 28, 1994, and patent application Ser. No. 08/321,855, filed Oct. 14, 1994 now U.S. Pat. No. 5,521,980 and 5,606,617, respectively. The inventive modification technique straightforwardly applies to all the secret-key certificate schemes that are described in these references, and variations thereof. More generally, one can use the inventive modification technique in conjunction with functions $f(\cdot)$ other than that defined, by the pair (F,M), in the presented embodiments. The inventive modification technique works for any function $f(\cdot)$ such that: given f(a) and b for a,b in $\mathbb{Z}_p$ (resp. in $\mathbb{Z}_n$ for the second preferred embodiment), it is easy to compute f(ab mod p) (resp. f(ab mod n)); and given f(a) and f(b) for a,b in $\mathbb{Z}_p$ (resp. in $\mathbb{Z}_n$ for the second preferred embodiment), it should be unfeasible to compute algebraic relations such as f(ab mod p), $f(a^5 b^7$ mod p), (resp. f(ab mod n), $f(a^5 b^7$ mod n)). Moreover, if the described inventive timing mechanism is used, it suffices that computing such algebraic relations be unfeasible within the imposed time bound (which may not be more than a fraction of a second).

It will also be obvious to those of ordinary skill in the art how parts of the inventive techniques and protocols disclosed here can be used to advantage.

What is claimed is:

1. One or more computer readable media carrying one or more sequences of instructions for constructing a certificate issuing protocol wherein an issuer party issues triples, consisting of a secret key, a matching public key, and a certificate of the issuer party on the public key, such that a receiver party can blind the public key and the corresponding certificate, but not a non-trivial blinding-invariant predicate of the secret key even when executions of the issuing protocol are performed in parallel, wherein execution of one or more of the sequences of instructions by one or more processors causes the one or more processors to perform the steps of:

generating by one or more processors of the issuer party a secret key $(x_o,g)$, a public key $p,g,h_o,g_I)$ and a function $f(\cdot)$, where:

q is a prime number;

$x_o$ and g are elements of the ring, $\mathbb{Z}_q$, of integers modulo q;

p is a prime number such that q divides p−1 evenly;

g is an element of order q in the group, $\mathbb{Z}_p$, of integers modulo p;

$h_o$ is equal to $g^{x_o}$ mod p;

$g_I$ is equal to $g^{\tilde{g}}$ mod p; and for a,b in $\mathbb{Z}_p$ it is easier to compute f(ab mod p) given f(a) and b than it is to compute $f(a^\alpha b^\beta$ mod p) from f(a) and f(b) for known $\alpha$ and $\beta$;

generating for public use a hash-function H(·) that maps its arguments to $\mathbb{Z}_{2^l}$ for a security parameter l;

generating in the issuing protocol by the one or more processors of the issuer party a substantially random number $w_o$ in $\mathbb{Z}_q$, computing $a_o \leftarrow f(g^{w_o}$ mod p), and transferring a signal representative of $a_o$ to one or more processors of the receiver party;

generating in the issuing protocol by the one or more processors of the receiver party a number x in $\mathbb{Z}_q$, computing a public key $h \leftarrow g^x g_I^I$ mod p, where I mod q represents the blinding-invariant part of the corresponding secret key (x,I);

generating in the issuing protocol by the one or more processors of the receiver party two substantially random numbers t and u in $\mathbb{Z}_q$, computing $a \leftarrow f(g^{w_o} g^t (h_o g_I^I)^u$ mod p) from $a_o$ and $g^t(h_o g_I^I)^u$ mod p, and computing $c \leftarrow H(h,a)$; computing in the issuing protocol by the one or more processors of the receiver party the challenge $c_o \leftarrow c+u$ mod q, and transferring a signal of $c_o$ to the one or more processors of the issuer party;

computing in the issuing protocol by the one or more processors of the issuer party the response $r_o \leftarrow c_o(x_o + yI) + w_o$ mod q, and transferring a signal representative of $r_o$ to the one or more processors of the receiver party; and verifying by the one or more processors of the receiver party that $f(g^{r_o}(h_o g_I^I)^{-c_o}$ mod p) is equal to $a_o$, and computing $r \leftarrow r_o + cx + t$ mod q in order to complete the certificate (c,r) on the public key h.

2. The one or more computer readable media of claim 1, where f(·) is specified by a modulus M such that p divides the order of $\mathbb{Z}_M$ evenly, and an element F in $\mathbb{Z}_M$ of order p, and f(·) assigns to an element a in $\mathbb{Z}_p$ the number $F^a$ mod M.

3. The one or more computer readable media of claim 1, wherein execution of one or more of the sequences of instructions by the one or more processors further causes the one or more processors of the issuer party to time a delay between sending out to the one or more processors of the receiver party the signal representative of $a_o$ and receiving from the one or more processors of the receiver party the signal representative of $c_o$, by using a clock, and to withhold the corresponding response $r_o$ it this delay exceeds a predetermined time bound.

4. One or more computer readable media carrying one or more sequences of instructions for constructing a certificate issuing protocol wherein an issuer party issues triples, consisting of a secret key, a matching public key, and a certificate of the issuer party on the public key, such that a receiver party can blind the public key and the corresponding certificate, but not a non-trivial blinding-invariant predicate of the secret key even when executions of the issuing protocol are performed in parallel, wherein execution of one or more of the sequences of instructions by one or more processors causes the one or more processors to perform the steps of:

generating by one or more processors of the issuer party a secret key $(x_o,g)$, a public key $(n,v,h_o,g_I)$ and a function f(·), where:

n is the product of two prime numbers;

$x_o$ and g are elements of the group, $\mathbb{Z}_n$, of integers modulo n;

v is an element of $\mathbb{Z}_n$ that is co-prime to the order of $\mathbb{Z}_n$;

$h_o$ is equal to $x_o^v$ mod n;

$g_I$ is equal to $g^v$ mod n; and for a,b in $\mathbb{Z}_n$ it is easier to compute f(ab mod n) given f(a) and b than it is to compute $f(a^\alpha b^\beta$ mod n) from f(a) and f(b) for known $\alpha$ and $\beta$;

generating for public use a hash-function H(·) that maps its arguments to $\mathbb{Z}_{2^l}$ for a security parameter l;

generating in the issuing protocol by the one or more processors of the issuer party a substantially random number $w_o$ in $\mathbb{Z}_n$, computing $a_o \leftarrow f(w_o^v$ mod n), and transferring a signal representative of $a_o$ to one or more processors of the receiver party;

generating in the issuing protocol by the one or more processors of the receiver party a number x in $\mathbb{Z}_n$, computing a public key $h \leftarrow x^v g_I^I$ mod n, where I mod v represents the blinding-invariant part of the corresponding secret key (x,I);

generating in the issuing protocol by the one or more processors of the receiver party two substantially random numbers t in $\mathbb{Z}_n$ and u in $\mathbb{Z}_v$, computing $a \leftarrow f(w_o^v t^v (h_o g_I^I)^u$ mod n) from $a_o$ and $t^v(h_o g_I^I)^u$ mod n, and computing $c \leftarrow H(h,a)$;

computing in the issuing protocol by the one or more processors of the receiver party the challenge $c_o \leftarrow c+u$ mod v, and transferring a signal representative of $c_o$ to the one or more processors of the issuer party;

computing in the issuing protocol by the one or more processors of the issuer party the response $r_o \leftarrow (x_o g^I)^{c_o} w_o$ mod n, and transferring a signal representative of $r_o$ to the one or more processors of the receiver party; and verifying by the one or more processors of the receiver party that $f(r_o^v(h_o g_I^I)^{-c_o}$ mod n) is equal to $a_o$, and computing $r \leftarrow r_o x^c t (h_o g_I^I)^{c+udiv\,v}$ mod n in order to complete the certificate (c,r) on the public key h.

5. The one or more computer readable media of claim 4, where f(·) is specified by a modulus M, such that n divides the order of $\mathbb{Z}_M$ evenly, and an element F in $\mathbb{Z}_M$ of order n, and f(·) assigns to an element a in $\mathbb{Z}_n$ the number $F^a$ mod M.

6. The one or more computer readable media of claim 4, wherein execution of one or more of the sequences of instructions by the one or more processors further causes the one or more processors of the issuer party to time a delay between sending out to the one or more processors of the receiver party the signal representative of $a_o$ and receiving from the one or more processors of the receiver party the signal representative of $c_o$, by using a clock, and to withhold the corresponding response $r_o$ it this delay exceeds a predetermined time bound.

* * * * *